UNITED STATES PATENT OFFICE 2,266,276

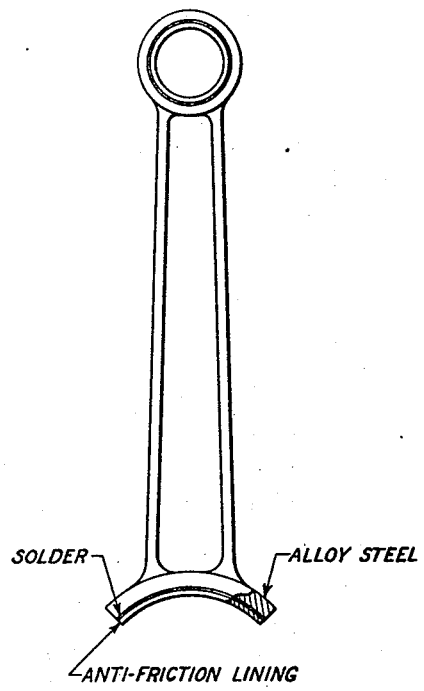

COMBINED HEAT TREATMENT AND BENDING METHOD

Alfred W. Schluchter, Dearborn, and Arthur F. Underwood, Grosse Pointe, Mich., assignors to General Motors Corporation, Detroit, Mich., a corporation of Delaware Application June 23, 1939, Serial No. 280,856

5 Claims. (Cl. 29—149.5)

This invention relates to a method of bonding two elements together during the necessary process of heat treatment required by at least one of the elements.

More specifically it relates to a method and means of securing an anti-friction lining, preferably of copper or silver base, to the bearing surface of an alloy steel part which is heat treated by being heated, quenched and drawn, and especially a connecting rod between a piston and crankpin of an engine.

Particularly in the case of connecting rods of the so-called slipper type, of which the big end bearing does not completely embrace the crankpin, but only extends through a small arc of a circle, there is difficulty in adequately securing an anti-friction lining to the slipper end. It may be mechanically fastened thereto, but a bonded joint between the anti-friction lining and the connecting rod, is preferable for the sake of maximum thermal conductivity between the parts.

The bonding might be effected before, during, or after the heat treating operation on the connecting rod. It is essential however, that any heat incidental to the bonding should not interfere with the tempering, or the temper, of the connecting rod. If bonding is effected before heat treatment, a bonding material having a melting point higher than the maximum heat treatment temperature to which the connecting rod is subjected would be required. If bonding is effected after heat treatment, a bonding material having a melting point lower than the drawing temperature of the connecting rod will be required, in order that the temper of the connecting rod may not be interfered with, and it is doubtful if one strong enough could be found.

The object of the invention is a method of bonding two elements together during the necessary process of heat treatment required by at least one of the elements.

A more specific object of the invention is a method of bonding a high melting point anti-friction lining to a steel connecting rod by a suitable solder having a melting point intermediate of the temperature to which the connecting rod is heated and the drawing temperature to which the connecting rod is subjected.

Still another object of the invention is a method of soldering a copper lead, or silver lead, anti-friction lining to a connecting rod, in such a way that the temper of the connecting rod will not be interfered with by the heat of soldering.

The above and other objects of the invention will be apparent as the description proceeds.

It has been found that a hard solder such as silver solder will effect an adequate bond, and since such a solder may have a melting point intermediate of the temperature to which the connecting rod is heated and the drawing temperature to which the rod is subjected, the soldering may be combined with the heat treating operation.

The drawing shows a slipper type connecting rod of alloy steel with an anti-friction lining which may be of copper, silver or other suitable metal base, bonded thereto by a thin layer of silver solder.

According to the invention, the connecting rod without its anti-friction lining, is preferably copper plated. This prevents decarbonization of the connecting rod in a reducing atmosphere in which it is subsequently heat treated, and assists the bonding of the solder to the steel of the connecting rod.

The anti-friction lining which is preferably a sheet of embossed silver or copper, shaped to fit the bearing surface of the connecting rod, is assembled in position on the connecting rod, with a thin sheet of silver solder interposed therebetween.

The assembly is next heated in a hydrogen atmosphere to a temperature which is above the melting point of the solder, then quenched, the solder setting before or during the quenching operation to bond the parts securely together. Thereafter the connecting rod is drawn to the required temper.

The embossing is then filled with lead alloy or any other suitable babbitt which has a temperature well below the drawing point of the steel and the connecting rod is finally finish machined.

In a given example for instance, the connecting rod is of electric furnace steel, the anti-friction lining is of embossed silver .030" thick, and the silver solder is .003" thick and melts at 1435° F. to 1500° F. The parts are held in an assembled position in a suitable fixture, and heated in a hydrogen atmosphere for 30 minutes at 1510° F. to 1550° F. The temperature of the connecting rod is then dropped to 1350° F. when it is quenched in oil and then drawn to the required temper which is well below the remelting point of the solder. The embossing is subsequently filled by "tinning" with lead alloy at 750° F., and the connecting rod is finally finish machined.

While the invention has been described in its application to a connecting rod, it will be obvious that the invention is not necessarily limited to such an example, and can be applied to elements other than connecting rods in which similar considerations are involved. It will be apparent for instance that both sides of any steel strip could be provided with anti-friction linings according to the invention, and that the soldering would then be effected on both sides at the same time.

We claim:

1. The method of combining the soldering of an anti-friction lining to the bearing surface of an element to be heat treated, with the heat treating process therefor, which consists in assembling the anti-friction lining on the element with a thin sheet of solder interposed therebetween, said solder having a melting point lower than the temperature to which the element is heated for heat treatment but higher than the drawing temperature thereof, heating the assembly, quenching and then drawing it to the required temper; said solder being fused during the heating operation and solidifying to bond the anti-friction lining to the bearing surface of the element before it is drawn.

2. The method according to claim 1, in which the heating is carried out in a furnace with a reducing atmosphere, and the element is first copper plated to prevent decarbonization and to assist the bond between the solder and the element.

3. The method according to claim 1, in which the element is a steel connecting rod, the anti-friction lining is of embossed metal and the bonding material is silver solder melting at 1435° F. to 1500° F.; said anti-friction lining being held by a suitable fixture, in its assembled position on the connecting rod, with a layer of solder therebetween, and the assembly being heated in a reducing atmosphere to from 1510° to 1550° F., quenched at 1400° F. to 1000° F., and drawn at 1000° F. to 1175° F.

4. The method according to claim 1, in which the element is a steel connecting rod, the anti-friction lining is of embossed metal and the bonding material is silver solder melting at 1435° F. to 1500° F., said anti-friction lining being held by a suitable fixture, in its assembled position on the connecting rod, with a layer of solder therebetween, the assembly being heated in a reducing atmosphere to from 1510° to 1550° F., quenched at 1400° F. to 1000° F., drawn to the required temper, and the embossing then filled by "tinning" with lead allow at 750° F.

5. The method of combining the bonding of an element to another element to be heat treated, with the heat treating process therefor, which consists in assembling the elements together with a thin sheet of solder interposed therebetween, said solder having a melting point lower than the temperature to which the element is heated for heat treatment but higher than the drawing temperature thereof, heating the assembly, quenching and then drawing it to the required temper; said solder being fused during the heating operation and solidifying to bond the two elements together before they are drawn.

ALFRED W. SCHLUCHTER.
ARTHUR F. UNDERWOOD.

CERTIFICATE OF CORRECTION.

Patent No. 2,266,276. December 16, 1941.

ALFRED W. SCHLUCHTER, ET AL.

It is hereby certified that error appears in the above numbered patent requiring correction as follows: In the grant, and in the heading to the printed specification and drawings, title of invention, for the word "BENDING" read --BONDING--; page 2, second column, line 19, claim 4, for "allow" read --alloy--; and that the said Letters Patent should be read with this correction therein that the same may conform to the record of the case in the Patent Office.

Signed and sealed this 10th day of March, A. D. 1942.

(Seal)

Henry Van Arsdale,
Acting Commissioner of Patents.